United States Patent
Knudson et al.

(10) Patent No.: US 10,204,624 B1
(45) Date of Patent: Feb. 12, 2019

(54) FALSE POSITIVE WAKE WORD (71) Applicant: Lenovo (Singapore) Pte. Ltd., Singapore (SG)

(72) Inventors: Ryan Charles Knudson, Durham, NC (US); Russell Speight VanBlon, Raleigh, NC (US); Roderick Echols, Chapel Hill, NC (US); Jonathan Gaither Knox, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/676,176

(22) Filed: Aug. 14, 2017

(51) Int. Cl.
- *G10L 15/02* (2006.01)
- *G10L 15/26* (2006.01)
- *G10L 15/14* (2006.01)
- *G10L 15/20* (2006.01)
- *G10L 15/22* (2006.01)

(52) U.S. Cl.
CPC ........ *G10L 15/22* (2013.01); *G10L 2015/223* (2013.01)

(58) Field of Classification Search
CPC ................. G06F 9/4443; H04M 1/72522; G10L 15/265; G10L 15/22; G10L 15/142; G10L 15/20
See application file for complete search history.

(56) References Cited

U.S. PATENT DOCUMENTS

| | | | | |
|---|---|---|---|---|
| 6,594,630 B1* | 7/2003 | Zlokarnik | ............... | G10L 15/26 704/256.5 |
| 7,418,392 B1* | 8/2008 | Mozer | ..................... | G10L 15/26 315/307 |
| 9,368,105 B1* | 6/2016 | Freed | ........................ | G10L 15/22 |
| 9,589,560 B1* | 3/2017 | Vitaladevuni | ............ | G10L 15/01 |
| 9,697,822 B1* | 7/2017 | Naik | ..................... | G10L 15/063 |
| 9,697,828 B1* | 7/2017 | Prasad | .................... | G10L 15/18 |
| 9,728,188 B1* | 8/2017 | Rosen | ..................... | G10L 15/22 |
| 9,747,899 B2* | 8/2017 | Pogue | ..................... | G10L 15/22 |
| 9,779,726 B2* | 10/2017 | Hatfield | .................. | G10L 15/22 |
| 9,779,732 B2* | 10/2017 | Lee | .......................... | G10L 15/22 |
| 9,805,715 B2* | 10/2017 | Yue | ........................ | G10L 15/083 |
| 9,817,671 B2* | 11/2017 | Harrington | ............... | G06F 9/44 |
| 9,899,021 B1* | 2/2018 | Vitaladevuni | ......... | G10L 15/142 |
| 2010/0235167 A1* | 9/2010 | Bourdon | ............... | G10L 15/063 704/231 |
| 2013/0132095 A1* | 5/2013 | Murthi | .................. | G06F 1/3234 704/275 |
| 2014/0163978 A1* | 6/2014 | Basye | ..................... | G10L 15/28 704/233 |
| 2014/0214416 A1* | 7/2014 | Yue | ........................ | G10L 15/083 704/231 |

(Continued)

*Primary Examiner* — Anne L Thomas-Homescu
(74) *Attorney, Agent, or Firm* — Ference & Associates LLC (57) ABSTRACT

One embodiment provides a method, comprising: receiving, at an information handling device, user input comprising a word that activates a digital assistant associated with the information handling device; determining, using a processor, whether the word comprises a false positive wake word, wherein the false positive wake word comprises a stored wake word; and responsive to determining that the word is associated with a false positive wake word, providing output associated with an alternative wake word. Other aspects are described and claimed.

19 Claims, 3 Drawing Sheets

(56) References Cited

U.S. PATENT DOCUMENTS

| | | | |
|---|---|---|---|
| 2014/0222436 A1* | 8/2014 | Binder | G06F 3/167 704/275 |
| 2014/0257813 A1* | 9/2014 | Mortensen | G10L 15/02 704/251 |
| 2014/0274203 A1* | 9/2014 | Ganong, III | H04W 52/0251 455/556.1 |
| 2014/0337036 A1* | 11/2014 | Haiut | G06F 1/3265 704/275 |
| 2015/0081296 A1* | 3/2015 | Lee | G10L 15/20 704/239 |
| 2015/0185993 A1* | 7/2015 | Wheatley | G06F 3/0484 715/744 |
| 2015/0378742 A1* | 12/2015 | Harrington | G06F 9/44 719/318 |
| 2016/0077794 A1* | 3/2016 | Kim | G06F 3/167 704/275 |
| 2016/0260431 A1* | 9/2016 | Newendorp | G10L 15/32 |
| 2016/0322045 A1* | 11/2016 | Hatfield | G10L 15/22 |
| 2017/0125036 A1* | 5/2017 | Wang | G10L 17/02 |
| 2017/0154620 A1* | 6/2017 | Berthelsen | G10L 15/16 |
| 2017/0186446 A1* | 6/2017 | Wosk | G10L 25/78 |
| 2017/0194001 A1* | 7/2017 | Mortensen | G10L 15/02 |
| 2017/0256255 A1* | 9/2017 | Bocklet | G06F 17/3053 |
| 2017/0309274 A1* | 10/2017 | LeBeau | G06F 3/167 |
| 2017/0315519 A1* | 11/2017 | Laurent | G05B 15/02 |
| 2017/0358294 A1* | 12/2017 | Hatfield | G10L 15/22 |
| 2018/0005633 A1* | 1/2018 | Bocklet | G10L 17/04 |
| 2018/0012593 A1* | 1/2018 | Prasad | G10L 15/18 |
| 2018/0061396 A1* | 3/2018 | Srinivasan | G06F 17/3074 |
| 2018/0108343 A1* | 4/2018 | Stevans | G10L 13/08 |
| 2018/0204569 A1* | 7/2018 | Nadkar | G10L 15/22 |

* cited by examiner

FALSE POSITIVE WAKE WORD

BACKGROUND

Information handling devices ("devices"), for example smart phones, tablet devices, smart speakers, laptop and personal computers, and the like, may be capable of receiving command inputs and providing outputs responsive to the inputs. Generally, a user interacts with a voice input module, for example embodied in a digital assistant through use of natural language. Conventional digital assistants need to be activated, or "waken", by way of a predetermined input, e.g., by audibly saying the virtual assistant's "name", providing a predetermined gesture, by audibly saying a particular phrase, or the like.

BRIEF SUMMARY

In summary, one aspect provides a method, comprising: receiving, at an information handling device, user input comprising a potential wake word; determining, using a processor, whether the potential wake word is associated with a stored wake word; and responsive to determining that the potential wake word is associated with the stored wake word, activating, based on the potential wake word, a digital assistant associated with the information handling device.

Another aspect provides an information handling device, comprising: a processor; a memory device that stores instructions executable by the processor to: receive user input comprising a word that activates a digital assistant associated with the information handling device; determine whether the word comprises a false positive wake word, wherein the false positive wake word comprises a stored wake word; and provide, responsive to determining that the word is associated with a false positive wake word, output associated with an alternative wake word.

A further aspect provides a product, comprising: a storage device that stores code, the code being executable by a processor and comprising: code that receives user input comprising a word that activates a digital assistant associated with the information handling device; code that determines whether the word comprises a false positive wake word, wherein the false positive wake word comprises a stored wake word; and code that provides, responsive to determining that the word is associated with a false positive wake word, output associated with an alternative wake word.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Users frequently utilize devices to execute a variety of different commands or queries. One method of interacting with a device is to use digital assistant software employed on the device (e.g., Siri® for Apple®, Cortana® for Windows®, Alexa® for Amazon®, etc.). Digital assistants are able to provide outputs (e.g., audible outputs, visual outputs, etc.) that are responsive to a variety of different types of user inputs (e.g., voice inputs, etc.).

Conventionally, prior to providing the command or query input, currently available commercial systems require the device to be "awoken", or activated, by a wake word or phrase provided by the user. For example, a user may say "Hey Siri" while using a device running iOS 8 or later or say "Alexa" while using a dedicated smart speaker such as the Echo®. Once a user provides a wake word, the device is activated and subsequently listens for voice commands following the wake word. However, situations arise where a user inadvertently activates a digital assistant by providing a false positive wake word, i.e., a word that is either the wake word itself or a word that shares audible characteristics with the wake word but was not provided by the user with the intention of activating a digital assistant. For example, a user may be engaged in conversation with their friend, Alexa, and audibly inquire "Alexa, how do I get to Restaurant A?" In such a situation, if a digital assistant having "Alexa" as their wake word was in proximity to the user during this utterance, the digital assistant may activate and begin providing the user with directions to the restaurant.

Current digital assistant applications do nothing to prevent false-positive digital assistant activation. When a digital assistant is triggered by mistake, the digital assistant simply waits for input to act upon, regardless of whether or not the user intended to activate it. Additionally, some digital assistants may provide audible output each time they are activated. For example, an activated digital assistant may query the user as to what type of command or query they would like to provide. The output heard from unintended digital assistant activation can become annoying and frustrating, especially if it is a frequent occurrence.

Accordingly, an embodiment provides a method for determining whether a word that activates a digital assistant is associated with a false positive wake word. In an embodiment, user input comprising a word that activates a digital assistant may be received at an information handling device. An embodiment may then determine whether the word is associated with a false positive wake word, where the false positive wake word may comprise a stored wake word that activates a digital assistant but was not intended to activate the digital assistant. Responsive to determining that the word is associated with a false positive wake word, an embodiment may provide output associated with an alternative wake word. Such a method may prevent users from inadvertently activating a digital assistant.

The illustrated example embodiments will be best understood by reference to the figures. The following description is intended only by way of example, and simply illustrates certain example embodiments.

Figure 1:
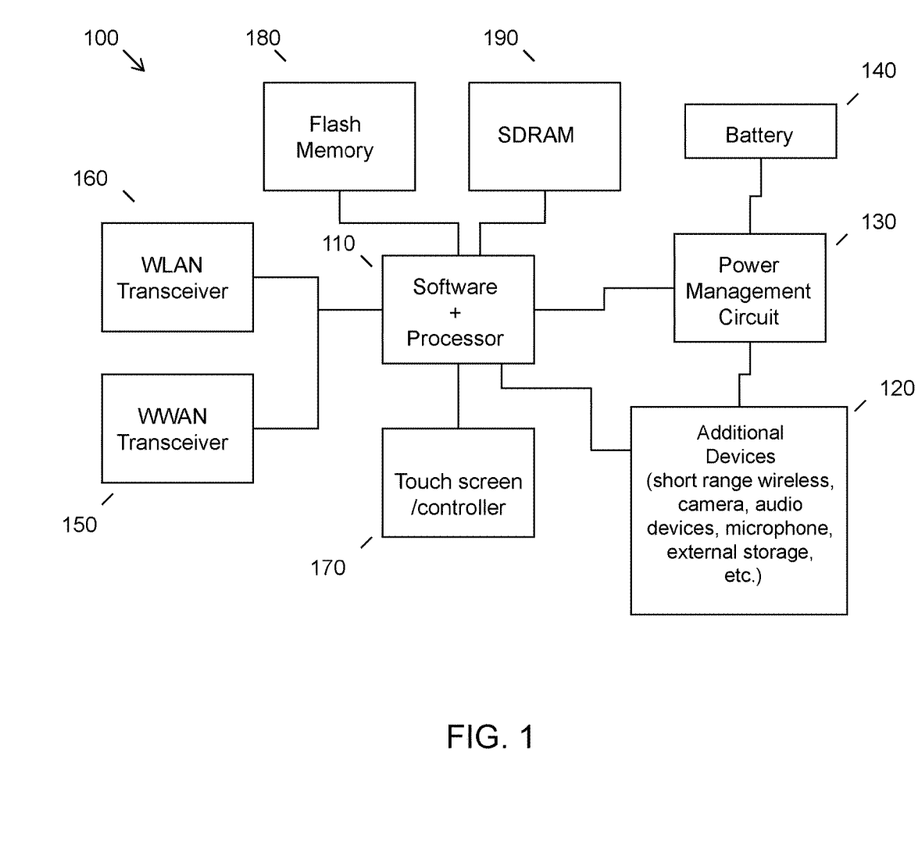
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes a touch screen 170 for data input and display/rendering. System 100 also typically includes various memory devices, for example flash memory 180 and SDRAM 190.

Figure 2:
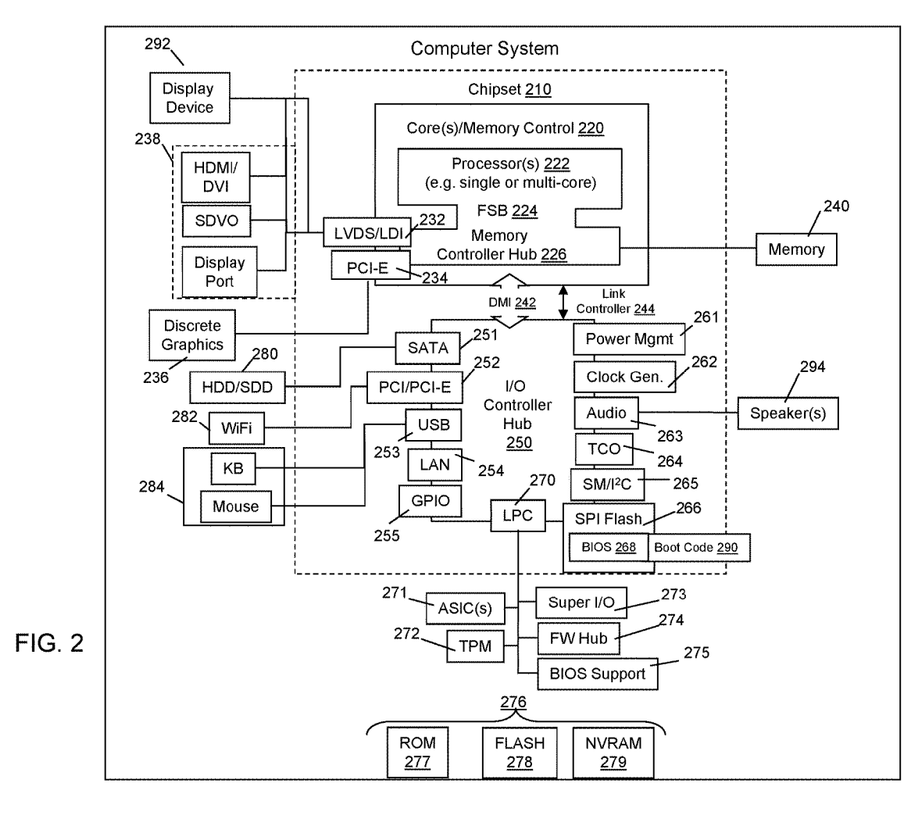
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, smart speakers, personal computer devices generally, and/or electronic devices which may include digital assistants that a user may interact with and that may perform various functions responsive to receiving user input. For example, the circuitry outlined in FIG. 1 may be implemented in a tablet or smart phone embodiment, whereas the circuitry outlined in FIG. 2 may be implemented in a personal computer embodiment.

Figure 3:
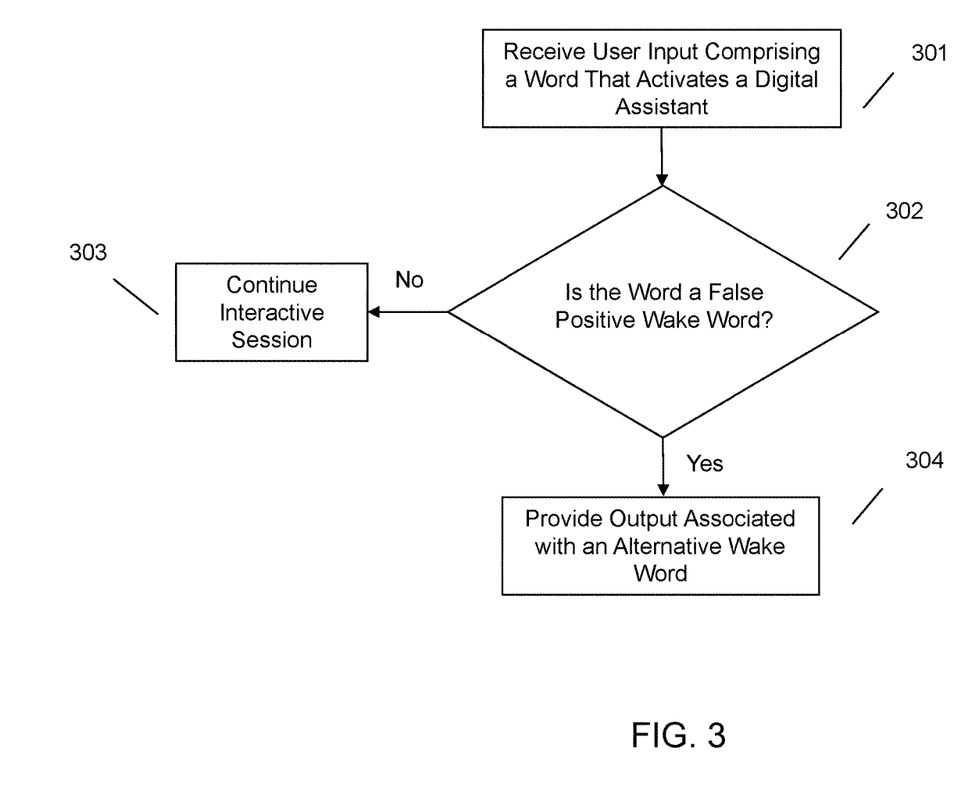
FIG. 3 illustrates an example method of determining that a word that activating a digital assistant is associated with a false positive wake word.

Referring now to FIG. 3, an embodiment may determine that a word that activates a digital assistant is associated with a false positive wake word. At 301, an embodiment may receive user input comprising a word that activates a digital assistant associated with an information handling device. In an embodiment, the user input may be audible, voice input and may be received at an input device (e.g., a microphone, a speech capture device, etc.) associated with the device.

In an embodiment, the input device may be an input device integral to the information handling device. For example, a smart phone may be disposed with a microphone capable of receiving voice input data. Alternatively, the input device may be disposed on another device and may transmit received voice input data to the information handling device. For example, voice input may be received at a smart speaker that may subsequently transmit the voice data to another device (e.g., to a user's smartphone for processing, etc.). Voice input data may be communicated from other sources to the information handling device via a wireless connection (e.g., using a BLUETOOTH connection, near field communication (NFC), wireless connection techniques, etc.), a wired connection (e.g., the device is coupled to another device or source, etc.), through a connected data storage system (e.g., via cloud storage, remote storage, local storage, network storage, etc.), and the like.

In an embodiment, the input device may be configured to continuously receive voice input data by maintaining the input device in an active state. The input device may, for example, continuously detect voice input data even when other sensors (e.g., cameras, light sensors, speakers, other microphones, etc.) associated with the information handling device are inactive. Alternatively, the input device may remain in an active state for a predetermined amount of time (e.g., 30 minutes, 1 hour, 2 hours, etc.). Subsequent to not receiving any voice input data during this predetermined time window, an embodiment may switch the input device to a power off state. The predetermined time window may be preconfigured by a manufacturer or, alternatively, may be configured and set by one or more users.

In an embodiment, the word that activates the digital assistant may be a wake up word or phrase that may be provided prior to or in conjunction with the user input. For example, a user may provide the vocal input, "Alexa, what is the fastest route from home to work?" In this scenario, "Alexa" is the wakeup word and upon identification of the wakeup word an embodiment may activate a digital assistant and/or prime the system to listen for additional user input. The activation word may be a default word or set by the user. Additionally, the input provided by the user may include a variant of a stored activation word, but may, nonetheless, activate the digital assistant software included on the information handling device.

At 302, an embodiment may determine whether the word is associated with a false positive wake word. In an embodiment, the determination may comprise identifying whether additional user input is provided after activation of the digital assistant. Responsive to identifying that no additional input was provided, an embodiment may associate the word with a false positive wake word. For example, if a user utters a word that activates a digital assistant and thereafter remains silent, an embodiment may determine that the user did not intend to activate the digital assistant and may thereafter associate the word with a false positive wake word. An embodiment may monitor for additional user input for a predetermined amount of time after the word is provided (e.g., 3 seconds, 5 seconds, etc.). Responsive to not receiving any user input within the predetermined time period, an embodiment may associate the word with a false positive wake word.

In an embodiment, the determination may comprise identifying whether additional user input, provided after activation of the digital assistant, comprises a user query or a user command. Responsive to identifying that the additional user input does not comprise a query or command, an embodiment may associate the word with a false positive wake word. For example, if a user utters a word that activates a digital assistant and thereafter provides a statement that does not contain an identifiable query or command, an embodiment may determine that the user did not intend to activate the digital assistant and may thereafter associate the word with a false positive wake word. An embodiment may have access to a stored list (e.g., stored locally, remotely, in the cloud, etc.) of common queries and/or commands. Responsive to identifying that the additional user input does not match one of the stored queries or commands, an embodiment may associate the word with a false positive wake word.

In an embodiment, the determination may comprise identifying whether additional user input, provided after activation of the digital assistant, comprises deactivation input. In an embodiment, deactivation input may be virtually any command input (e.g., provided by a user through any of voice input, gesture input, touch input, etc.) that communicates the user's intent to not activate the digital assistant and/or to order the digital assistant to deactivate (e.g., "No", "digital assistant, stop", "digital assistant, be quiet", etc.). An embodiment may have access to a stored list (e.g., stored locally, remotely, in the cloud, etc.) of common deactivation commands. Responsive to identifying that the additional user input comprises one of the stored commands, an embodiment may associate the word with a false positive wake word.

In one embodiment, the determination may comprise identifying whether a second user is in the room and whether the input appears to be directed at the second user. For example, an embodiment may use camera or other image capture sensors to determine a location and/or position of the user with respect to another user. If an embodiment determines that the user is facing or directing the input to the second user, an embodiment may associate the word with a false positive wake word. Similarly, an embodiment may make a determination based upon a user interacting with an information handling device. For example, if the user appears to be on the phone, an embodiment may determine that the user may not be directing the input at the digital assistant and may associate the word with a false positive word.

In an embodiment, after determining that a word is associated with a false positive wake word, an embodiment may store the false positive wake word in a list accessible by the device (e.g., stored locally, remotely, in the cloud, etc.). Upon subsequent iterations of the false-positive wake word (e.g., during a predetermined time period, etc.), an embodiment may, for example, ignore the false-positive wake word and not activate a digital assistant.

Responsive to determining, at 302, that the word is associated with a false positive wake word, an embodiment may provide, at 304, output associated with an alternative wake word. In an embodiment, the output may be audio output, visual output, a combination thereof, or the like. In an embodiment, the audible output may be provided through a speaker, another output device, and the like. In an embodiment, the visual output may be provided through a display screen, another display device, and the like. In an embodiment, the output device may be integral to the device or may be located on another device. In the case of the latter, the output device may be connected via a wireless or wired connection to the device. For example, a smart phone may provide instructions to provide audible output through an operatively coupled smart speaker. In an embodiment, the output may be provided without a user explicitly requesting that output should be provided.

In an embodiment, the provided output may comprise a suggestion for replacing the stored wake word with an alternative wake word. In one method, an embodiment may identify that a particular false-positive wake word has been provided N-number of times (e.g., 3 times, etc.) in a predetermined amount of time (e.g., 2 minutes, 5 minutes, 10 minutes, etc.). For example, a user may be engaged in a conversation with their friend, Alexa, but may also have a digital assistant in proximity that activates responsive to hearing the stored wake word, "Alexa". During the conversation, the user may frequently say their friend's name and an embodiment may determine (e.g., using at least one of the aforementioned false positive wake word determination techniques, etc.) that the word "Alexa" is associated with a false positive wake word. An embodiment may analyze the phonetic characteristics of the false positive wake word and suggest an alternative wake word having different phonetic characteristics than the false positive wake word to replace the stored wake word with.

In the previous example, an embodiment may suggest that the stored wake word, "Alexa", be replaced with the alternative wake word, "Gorbal", which has markedly different phonetic characteristics than "Alexa". Responsive to receiving user confirmation input (e.g., at least one of voice input, touch input, gesture input, etc. indicating user approval of the suggestion), an embodiment may replace the stored wake word with the suggested alternative wake word. In another method, an embodiment may analyze the phonetic characteristics of the conversation as a whole and suggest an alternative wake word having different phonetic characteristics than any word uttered, or predicted to be uttered, in the conversation. In yet another embodiment, an embodiment may not provide a suggestion at all, but rather, may automatically, without additional user input, replace a stored wake word with a determined alternative wake.

In an embodiment, the replacement of the stored wake word may be permanent or temporary. Regarding permanent replacement, an embodiment may replace the stored wake word with the alternative wake word until either the user manually adjusts the alternative wake word to another wake word or an embodiment automatically replaces the alternative wake word with yet another replacement wake word. Regarding temporary replacement, an embodiment may only replace the stored wake word with the alternative wake word for a predetermined time period (e.g., 5 minutes 10 minutes, etc.). The predetermined time period may be adjusted by the user. In another embodiment, an embodiment may identify a context associated with a user and replace the stored wake word with an alternative wake word only during the duration of the context. For example, an embodiment may identify that a user is engaged in a phone conversation with a stored contact named Alexa. If a stored wake word of a digital assistant associated with the phone was "Alexa", an embodiment may temporarily replace the stored wake word with an alternative wake word during, for example, the duration of the phone conversation. After the conversation is completed, an embodiment may replace the alternative wake word with the original stored wake word.

Responsive to determining, at 302, that the word is not associated with a false positive wake word, an embodiment may continue, at 303, with the interactive session.

The various embodiments described herein thus represent a technical improvement to conventional digital assistant activation techniques. Using the techniques described herein, an embodiment may receive user input comprising a word that activates a digital assistant associated with a device. An embodiment may then determine whether the word is associated with a false positive wake word, and, responsive to a positive determination, an embodiment may provide output associated with an alternative wake word. In an embodiment, the output may comprise a suggestion to change the stored wake word to an alternative wake word that comprises different phonetic characteristics than the stored wake word. Such techniques reduce instances of inadvertent digital assistant activation.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, at an information handling device, user input comprising a word that activates a digital assistant associated with the information handling device;
determining, after activating the digital assistant based upon the user input and using a processor, whether the word comprises a false positive wake word, wherein the false positive wake word comprises a stored wake word, wherein the determining comprises identifying that the stored wake word has been provided a predetermined number of times within a predetermined amount of time without receiving subsequent query input directed at the digital assistant; and
responsive to determining that the word is associated with a false positive wake word, providing output from the information handling device, wherein the output comprises a suggestion to replace the stored wake word with an alternative wake word, wherein the alternative wake word comprises a word having different phonetic characteristics than the stored wake word.

2. The method of claim 1, wherein the determining comprises identifying whether additional user input comprising at least one of a user query and a user command is provided after activation of the digital assistant.

3. The method of claim 2, responsive to identifying that the additional user input does not comprise at least one of the user query and the user command, associating the word with a false positive wake word.

4. The method of claim 1, wherein the determining comprises identifying whether additional user input comprising a deactivation input is provided after activation of the digital assistant.

5. The method of claim 4, responsive to identifying that the additional user input comprises a deactivation input, associating the word with a false positive wake word.

6. The method of claim 1, wherein the providing comprises replacing the stored wake word with the alternative wake word.

7. The method of claim 6, wherein the replacing the stored wake word comprises analyzing phonetic characteristics of the received user input and replacing the stored wake word with the alternative wake word.

8. The method of claim 6, further comprising identifying a context associated with a user and wherein the replacing comprises temporarily replacing the stored wake word with an alternative wake word during a duration of the context.

9. The method of claim 1, further comprising storing the false positive wake word in a list and thereafter not activating the digital assistant responsive to receiving the false positive wake word.

10. An information handling device, comprising:
a processor;
a memory device that stores instructions executable by the processor to:
receive user input comprising a word that activates a digital assistant associated with the information handling device;
determine, after activating the digital assistant based upon the user input, whether the word comprises a false positive wake word, wherein the false positive wake word comprises a stored wake word, wherein the determining comprises identifying that the stored wake word has been provided a predetermined number of times within a predetermined amount of time without receiving subsequent query input directed at the digital assistant; and
provide, responsive to determining that the word is associated with a false positive wake word, output from the information handling device, wherein the output comprises a suggestion to replace the stored wake word with an alternative wake word, wherein the alternative wake word comprises a word having different phonetic characteristics than the stored wake word.

11. The information handling device of claim 10, wherein the instructions executable by the processor to determine comprise instructions executable by the processor to identify whether additional user input comprising at least one of a user query and user command is provided after activation of the digital assistant.

12. The information handling device of claim 11, wherein the instructions are further executable by the processor to associate, responsive to identifying that the additional user input does not comprise at least one of the user query and the user command, the word with a false positive wake word.

13. The information handling device of claim 10, wherein the instructions executable by the processor to determine comprise instructions executable by the processor to identify whether additional user input comprising a deactivation input is provided after activation of the digital assistant.

14. The information handling device of claim 13, wherein the instructions are further executable by the processor to associate, responsive to identifying that the additional user input comprises a deactivation input, the word with a false positive wake word.

15. The information handling device of claim 10, wherein the instructions executable by the processor to provide comprise instructions executable by the processor to replace the stored wake word with the alternative wake word.

16. The information handling device of claim 15, wherein the instructions executable by the processor to replace the stored wake word comprise instructions executable by the processor to analyze phonetic characteristics of the received user input and replace the stored wake word with the alternative wake word.

17. The information handling device of claim 15, wherein the instructions are further executable by the processor to identifying a context associated with a user and wherein the instructions executable by the processor to replace comprise instructions executable by the processor to temporarily replace the stored wake word with an alternative wake word during a duration of the context.

18. The information handling device of claim 10, wherein the instructions are further executable by the processor to store the false positive wake word in a list and thereafter not activate the digital assistant responsive to receiving the false positive wake word.

19. A product, comprising:

a storage device that stores code, the code being executable by a processor and comprising:

code that receives user input comprising a word that activates a digital assistant associated with the information handling device;

code that determines, after activating the digital assistant based upon the user input, whether the word comprises a false positive wake word, wherein the false positive wake word comprises a stored wake word, wherein the determining comprises identifying that the stored wake word has been provided a predetermined number of times within a predetermined amount of time without receiving subsequent query input directed at the digital assistant; and code that provides, responsive to determining that the word is associated with a false positive wake word, output from the information handling device, wherein the output comprises a suggestion to replace the stored wake word with an alternative wake word, wherein the alternative wake word comprises a word having different phonetic characteristics than the stored wake word.

* * * * *